United States Patent [19]

Aron

[11] Patent Number: 5,024,053
[45] Date of Patent: Jun. 18, 1991

[54] AGRICULTURAL MACHINE HAVING AT LEAST ONE ROTOR FOR MOVING PRODUCTS LOCATED ON THE GROUND

[75] Inventor: M. Jerome Aron, Dossenheim - sur - Zinsel, France

[73] Assignee: Kuhn S.A., Saverne, France

[21] Appl. No.: 493,825

[22] Filed: Mar. 15, 1990

[30] Foreign Application Priority Data

Mar. 20, 1989 [FR] France .................. 89 03804

[51] Int. Cl.⁵ .............................................. A01D 78/10
[52] U.S. Cl. .................................... 56/367; 56/377; 56/DIG. 3; 56/DIG. 10
[58] Field of Search ............. 56/14.9, 12.5, 16.1, 56/16.4, 366, 367, 377, 380, 384, DIG. 3, DIG. 10, DIG. 21

[56] References Cited

U.S. PATENT DOCUMENTS

| 4,231,218 | 11/1980 | Delgado | 56/377 |
| 4,914,901 | 4/1990 | Aron | 56/377 |
| 4,922,700 | 5/1990 | Aron | 56/367 |

FOREIGN PATENT DOCUMENTS

| 2024167 | 11/1970 | Fed. Rep. of Germany. | |
| 2833814 | 2/1980 | Fed. Rep. of Germany. | |
| 8624528 | 12/1986 | Fed. Rep. of Germany. | |
| 0437889 | 11/1967 | Switzerland | 56/370 |
| 641320 | 2/1984 | Switzerland. | |

*Primary Examiner*—Terry Lee Melius
*Attorney, Agent, or Firm*—Oblon, Spivak, McClelland, Maier & Neustadt

[57] ABSTRACT

An agricultural machine comprises a frame which is adapted to be hooked to a drive tractor and carries at least one rotor equipped with work tools controlled by a central cam to move products such as hay which are on the ground. The rotor is connected to the frame by a pin which is positioned substantially perpendicular to the direction of advance of the machine and comprises a central support pin on which carrying wheels are connected. The agricultural machine further comprises an actuating mechanism positioned between the frame and the rotor of the machine which acts on the rotor to pivot the rotor around its hinge pin. With this arrangement, a partial load transfer from the front wheels onto the rear wheels or wheels can be obtained and the agricultural machine can adapt to the unevenness of the ground as well as clear all obstacles.

14 Claims, 4 Drawing Sheets

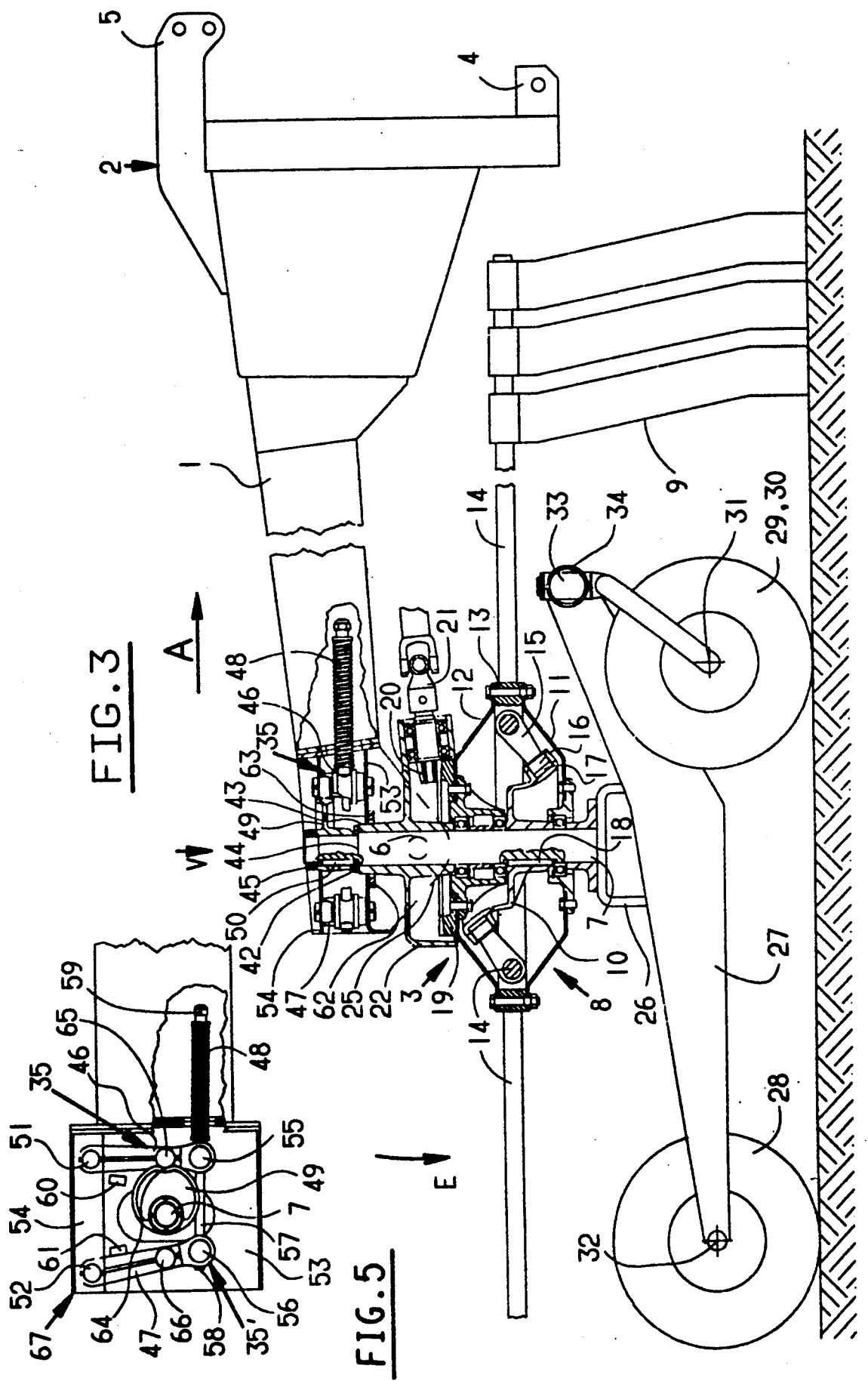

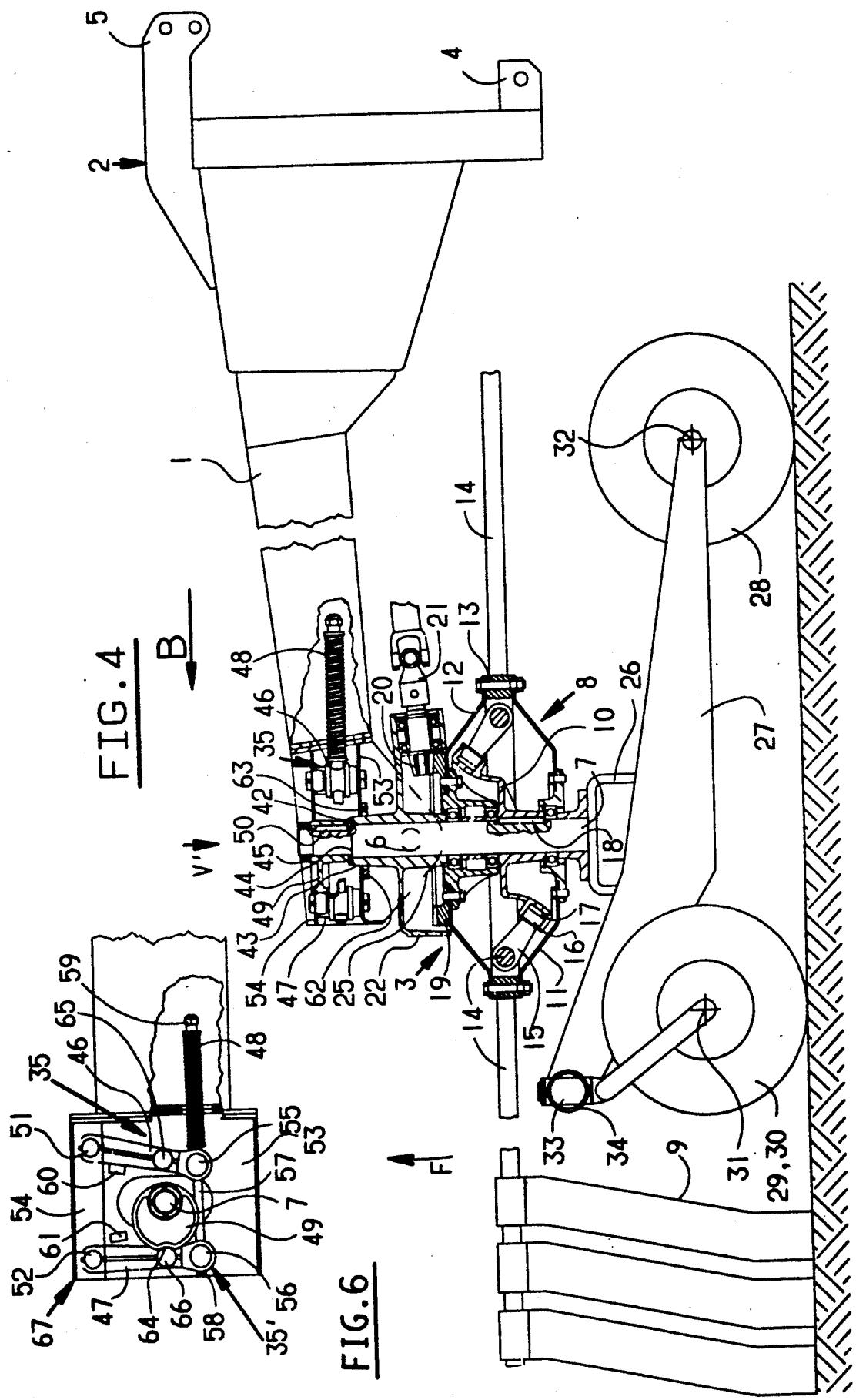

AGRICULTURAL MACHINE HAVING AT LEAST ONE ROTOR FOR MOVING PRODUCTS LOCATED ON THE GROUND

BACKGROUND OF THE INVENTION

Field of the Invention

The present invention relates to an agricultural machine comprising a frame which is adapted to be hooked to a drive tractor and carries at least one rotor equipped with work tools controlled by a central cam to move such products as hay, which are on the ground. The rotor is connected to the frame by a pin substantially perpendicular to the direction of advance of the machine and comprises a central support pin to which carrying wheels, which move on the ground during the work and which are placed on at least two lines offset relative to one another in the direction of advance of the machine, are connected.

In such a machine, the rotor can follow the unevenness of the ground when it is not too great. However, on greatly uneven fields and when the wheels which are foremost encounter a relatively steep obstacle such as the wall of a furrow, the rotor has a tendency to swing forward around its hinge pin. The weight of the rotor and the traction force which makes the machine move forward then being applied essentially to these front wheels. This also increases the difficulties that these wheels have in clearing the obstacle encountered. In addition, the front part of the rotor is pressed against the ground and the tools which are in this front part scrape the soil and even penetrate it and break.

SUMMARY OF THE INVENTION

Accordingly, an object of the present invention is to provide for an agricultural machine which can adapt to all the unevenness of the ground as well as clear all obstacles.

For this purpose, a feature of the invention is that between the frame and the rotor of the machine, actuating means are placed, acting constantly on the rotor, so that it has a tendency to pivot around its hinge pin located at its upper part, so that in the work position, the load supported by the wheels located foremost relative to the direction of advance is decreased and that the wheel or wheels located rearmost are pushed to the ground.

With this arrangement, a partial load transfer from the front wheels onto the rear wheel or wheels is obtained. The front wheels thereby move more easily in height to clear the obstacles which can arise. The risk that the rotor will swing forward, around its hinge pin on the frame, thus is practically eliminated.

According to another feature of the invention, the control cam of the work tools of the rotor can be turned 180° to work in forward or else in reverse, and two actuating means, one or the other acting on the rotor as a function of the direction of advance of the machine, are placed between the frame and the rotor.

This feature makes it possible to obtain the partial load transfer onto the rearmost wheel, whatever the direction of advance may be. This is particularly significant in the case of machines used in a back drawn position of a tractor and in a forward pushed position of a tractor or else in the two positions while remaining on the same side relative to the tractor. In the latter case, the machine is moved by the tractor alternately in forward and in reverse.

Another advantage of this feature is that the rearmost wheel can perfectly position the control cam of the work tools as a function of the direction of advance. Because of the fact that it is pushed to the ground, it is less sensitive to the unevenness of the ground and can assure a stable and continuous positioning.

Another feature of the invention consists in that the machine comprises means for immobilizing the support pin of the rotor when the wheels are withdrawn from the ground.

Accordingly, the agricultural machine of the present invention comprises: at least one rotor having work tools attached thereto for moving products located on the ground and comprising a control cam for controlling the tools, the at least one rotor being connected to the frame by a hinge pin located at its upper part, the pin being substantially perpendicular to the direction of advance of the machine. The rotor further comprises a central support pin which is connected to front and rear, relative to the direction of advance, carrying wheels, wherein the carrying wheels move on the ground during work and are positioned on at least two lines offset with respect to one another in the direction of advance of the machine; and actuating means positioned between the frame and the rotor for acting on the rotor to make the rotor pivot around the hinge pin; wherein, in a work position, a load supported by the front wheels, relative to the direction of advance, is decreased, and the rear wheels, relative to the direction of advance, are pushed to the ground.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a side view with a partial section of a third embodiment;

FIG. 4 shows a view similar to that of FIG. 3, the machine being in a second work position;

FIG. 5 shows, in larger scale and with a partial section, a view along arrow V of FIG. 3; and FIG. 6 also shows, in larger scale and with a partial section, a view along arrow V' of FIG. 4.

DESCRIPTION OF THE PREFERRED EMBODIMENTS

Figure 1:
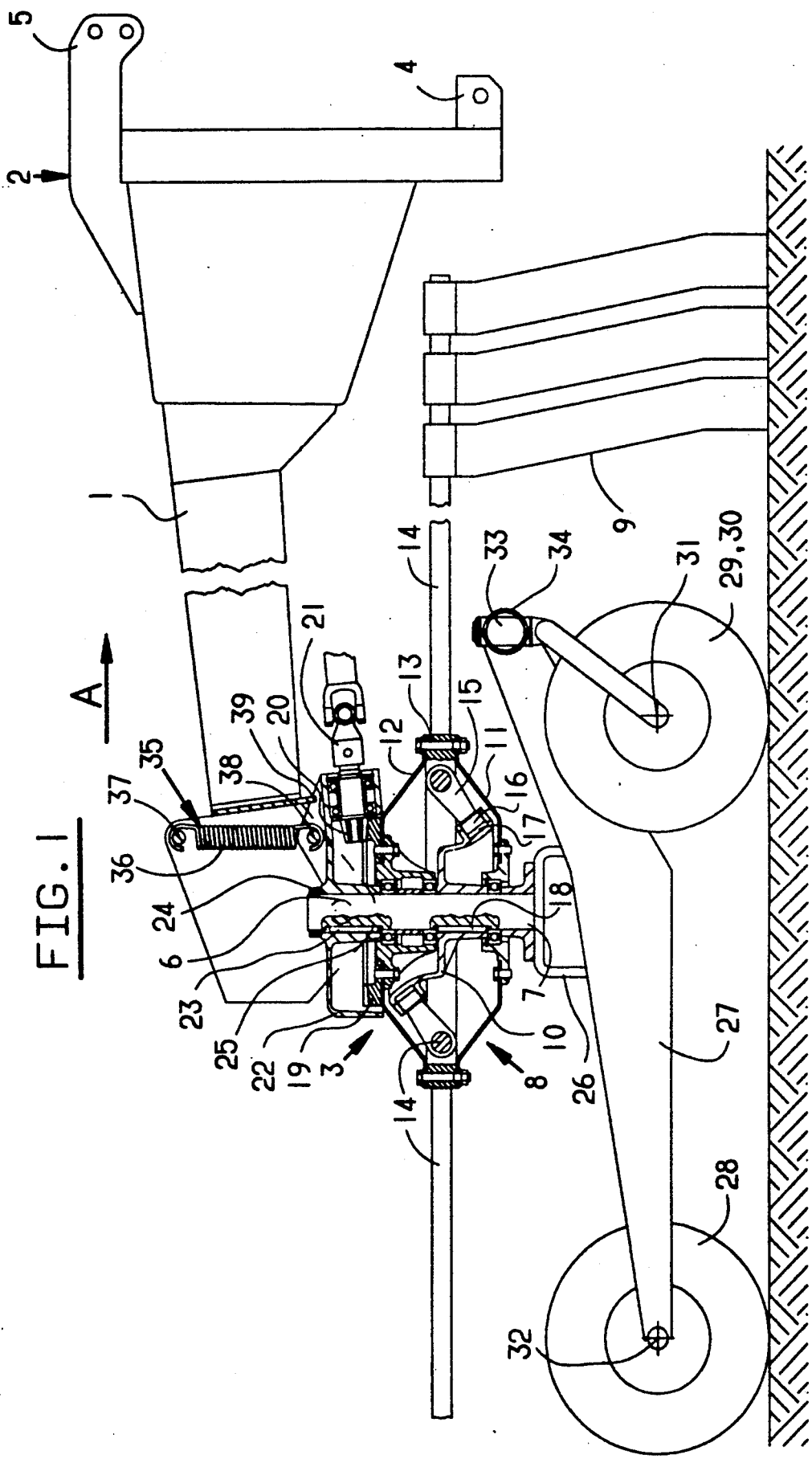
FIG. 1 shows a side view with a partial section of a first embodiment of a machine according to the invention.

The agricultural machine shown in FIG. 1 comprises in particular a frame (1) in the shape of a beam, carrying a coupling device (2) at one of its ends and a rotor (3) at its other end. The coupling device comprises two lower hooking points (4) and an upper hooking point (5) for the coupling to a lifting device of a tractor not shown.

Rotor (3) is connected at its upper part to frame (1) by a pin (6) which is substantially perpendicular to direction of advance (A) of the machine. The rotor comprises a substantially vertical support pin (7) on which a housing (8), which carries work tools (9) and surrounds a stationary cam (10) for the control of the tools, is mounted to be able to turn. The housing (8) comprises two parts (11 and 12) in the shape of caps which support bearings (13) for tool-holder arms (14). The tool holder arms (14) extend through these bearings (13) to be able to turn on themselves. One of their ends extends outside of housing (8) and carries tools (9) consisting of forks. The other end of each arm (14) is inside housing (8) and carries a lever (15) equipped with a roller (16) which is guided in control cam (10). For this purpose, the latter exhibits a traveling path (17) with an unevenness directed upward. The cam (10) is immobilized on support pin (7) by a key (18).

Upper part (12) of housing (8) carries a ring gear (19). The ring gear (19) is meshed with a driving pinion (20) which is integral with a shaft (21) adapted to be connected by intermediate shafts to the power takeoff shaft of the tractor. The shaft (21) is housed in a bore of a cover (22) located above ring gear (19). This cover (22) is itself attached to support pin (7) by a key (23) and a nut (24). In addition, it comprises on each side a housing for hinge pin (6) which is guided further in similar housings provided in lugs (25) integral with frame (1). This pin (6) is made in two parts aligned on one another and located on both sides of central support pin (7).

The support pin (7) is connected at its lower part to an elbowed support (26) which is connected to a side member (27) carrying three carrying wheels (28, 29 and 30) placed on two lines (31 and 32) which are substantially perpendicular to direction (A) but offset relative to one another seen in this direction (A). One (28) of these wheels is on a line (32) which is behind central support pin (7), while the two other wheels (29 and 30) are on a line (31) which passes before the pin (7). Rear wheel (28) is connected in a non-pivoting way to side member (27). The two other wheels (29 and 30) are connected to substantially vertical pins (33) provided on a crossbeam (34) integral with side member (27). These two wheels (29 and 30) have spaces between them and can pivot around pins (33). The number of wheels indicated above is not limiting. Two wheels (28) also can be provided, for example, on line (32).

Between rotor (3) and frame (1), an actuating means (35) is positioned, acting constantly on the rotor so that the load supported by front wheels (29 and 30) is decreased and rear wheel (28) is pushed to the ground. In the example of FIG. 1, the actuating means is a draw spring (36). The draw spring (36) is located in front of hinge pin (6) and is hooked with one end to a hooking point (37) of frame (1) and with its other end to a hooking point (38) in cover (22) of rotor (3). This spring (36) exerts a pull on the front part of rotor (3). In addition, frame (1) comprises a stop (39) above the front part of cover (22). This stop (39) serves to limit the movement of rotor (3) around its hinge pin (6) under the effect of the pull of spring (36).

Figure 2:
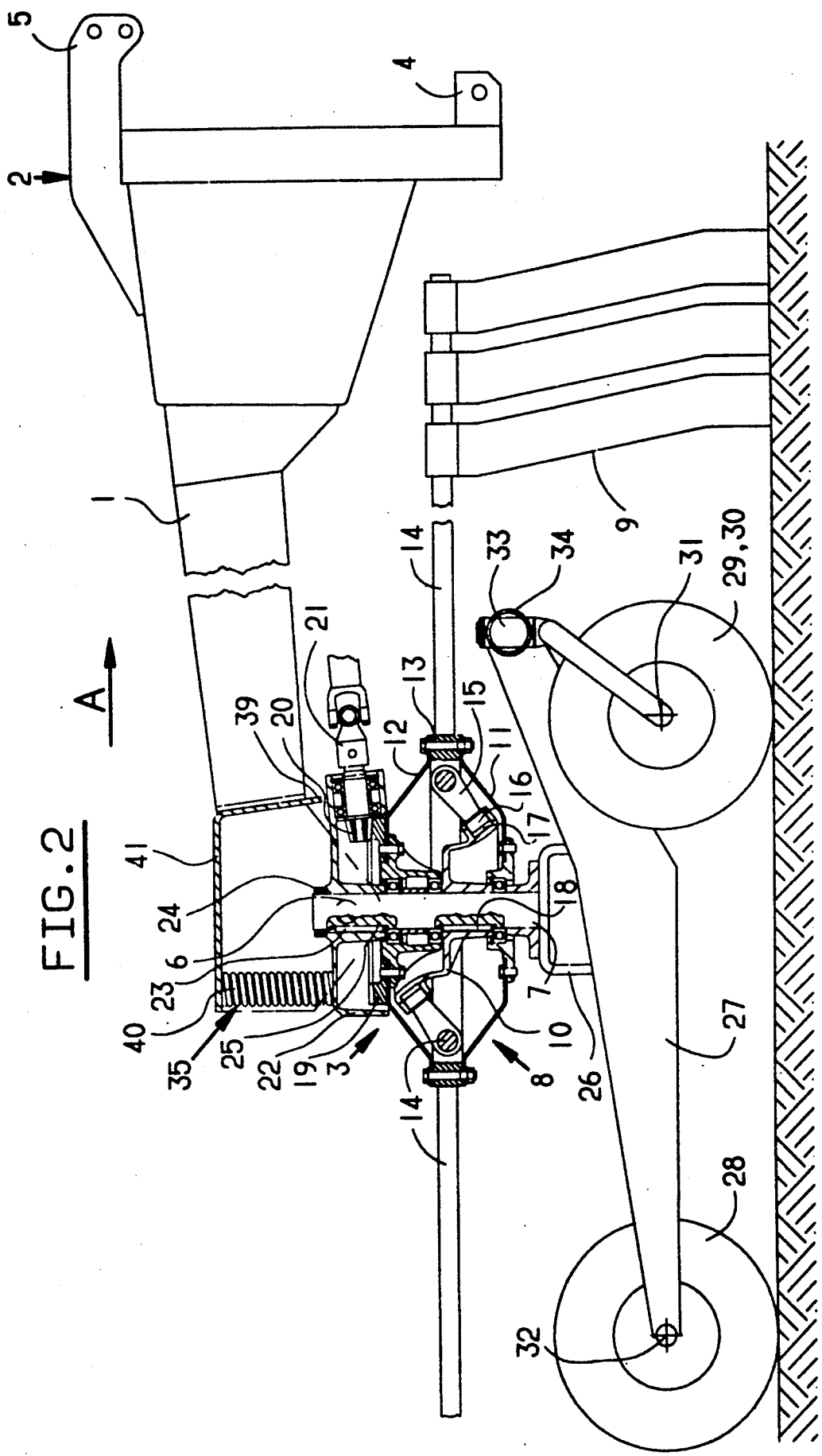
FIG. 2 shows a side view with a partial section of a second embodiment.

In the embodiment of FIG. 2, actuating means (35) comprises a pressure spring (40). The pressure spring (40) is behind hinge pin (6), as seen in direction of advance (A) of the machine. On one side, the spring (40) rests against an extension (41) of frame (1) and on the other side, on cover (22) of rotor (3). The spring (40) then exerts a pressure directed downward on the rear half of rotor (3), as seen in direction of advance (A). Frame (1) also comprises a stop (39) above the front part of cover (22). In addition, the spring (40) is guided inside to avoid any lateral bending.

The machine shown in FIGS. 3 and 4 can be transposed into two different positions to be able to work in direction (A) (FIG. 3) and in opposite direction (B) (FIG. 4). The parts common to the two examples described above are designated by the same reference numerals. To transfer from direction of work (A) to direction (B), or conversely, control cam (10) should be turned 180° so that the zone in which tools (9) gather the products at ground level is constantly on the foremost part of rotor (3). In the example of FIGS. 3 and 4, this rotation is obtained automatically. For this purpose, support pin (7) forms with control cam (10) and wheels (28, 29, 30) a unit able to turn 360° relative to the other parts of rotor (3). The pin (7) goes through cover (22) with a slight radial play. It is locked axially in rotor (3) by a washer (42) which abuts against a boss (43) of cover (22). Washer (42) itself is locked by a shoulder (44) provided on pin (7) and a clamping nut (45) screwed onto the upper end of the pin (7). Shoulder (44) nevertheless is slightly above boss (43) to avoid an immobilization in rotation of pin (7) during the clamping of nut (45).

The machine according to FIGS. 3 and 4 comprises two actuating means (35 and 35') one or the other acting on rotor (3) as a function of direction of advance (A or B) of the machine. In this case, hinge pin (6) of rotor (3) on frame (1) is at least close to support pin (7), the geometric axes of these pins (6 and 7) even able to intersect. Actuating means (35 and 35') are on both sides of the support pin (7), above hinge pin (6) of rotor (3) on frame (1). They act by pressure on the part of the support pin (7) which is above hinge pin (6). Actuating means (35 and 35') consist of two levers (46 and 47) located on both sides of support pin (7), a spring (48) pushing the levers toward support pin (7) and an eccentric (49). The latter is located on support pin (7) between two levers (46 and 47). It is immobilized in rotation on the pin by a key (50). In addition, it is located between the washer (42) and the nut (45) which assure its locking in the longitudinal direction on the support pin (7).

As is evident in particular in FIGS. 5 and 6, each lever (46 and 47) is connected by one of its ends to a substantially vertical pin (51, 52). These two pins (51, 52) are attached to a plate (53) and a plate (54) integral with frame (1). Each lever (46, 47) comprises a pivot (55, 56) at its other end, located beyond support pin (7). A rod (57) goes through these two pivots (55 and 56). The rod (57) is locked relative to lever (47) by a head (58), passes freely through pivot (55) of second lever (46) and extends beyond the latter, over a length approximately equal to the distance between the two levers (46 and 47). The part which thus extends beyond second lever (46) is surrounded by pressure spring (48). The latter is compressed between the lever (46) and a stop (59) consisting of a base and a nut screwed onto the end of rod (57). This spring (48) thus pushes the two levers (46 and 47) in the direction of eccentric (49). In addition, plate (53) comprises two stops (60 and 61) to limit the pivoting of levers (46 and 47) around their hinge pins (51 and 52) under the effect of the push of spring (48).

Eccentric (49) is positioned on support pin (7) so that it is directed forward, seen in direction of advance (A or B) of the machine. It is found in FIGS. 3 and 4 that this eccentric (49) is, relative to support pin (7), on the side opposite that on which steered wheel (28) is located. The latter assures the positioning of eccentric (49) at the same time as that of control cam (10). The dimensions of eccentric (49) are such that in the work position, it projects forward beyond (seen in direction of advance A or B) stop (60 or 61) of lever (46 or 47). Thus, when the machine is in the position to be moved in direction (A), lever (46) exerts a pressure on eccentric (49), while lever (47) is stopped by stop (61).

Conversely, when the machine is in the position to be moved in direction (B), lever (47) exerts a pressure on eccentric (49). Lever (46) then is stopped by its stop (60). Plate (53) of frame (1) comprises stops (62 and 63) on both sides of support pin (7) to limit the pivoting of rotor (3) around its hinge pin (6).

In addition, eccentric (49) exhibits a slot (64) in its foremost part relative to direction of advance (A or B) of the machine. Each lever (46, 47) comprises, in its part which is in contact with the eccentric, a projection (65, 66) having such dimensions that it can be housed in part in the slot (64). These projections (65, 66) advantageously can consist of rollers mounted free in rotation on levers (46, 47).

All actuating means (35 and 35') are housed above rotor (3) in a compartment (67) of frame (1). They thus are protected by the walls of the compartment.

During work, rotor (3) of various embodiments described above is driven in rotation around its support pin (7). This driving is assured by pinion (20) which itself is driven from the power takeoff shaft of the tractor which serves to move the machine in direction (A or B). During this rotation, cam (10) controls tool-holder arms (14) by their levers (15) and their rollers (16) which move in this cam (10). This control is such that in the front part of their path, tools (9) are approximately vertical and gather such products as hay, which are on the ground. Then, on the lateral part of their path, tools (9) are lifted and lay down the gathered products in the form of a windrow. Finally, on the rear part of their path, the tools gradually return to the position for gathering.

In the embodiment of FIG. 1, during the work, draw spring (36) pulls on the part of rotor (3) which is located in front of hinge pin (6) on frame (1). It thus causes a slight pivoting of entire rotor (3) around this hinge pin (6) and thereby brings about a load transfer from front wheels (29, 30) onto rear wheel (28). Wheels (29, 30) are partially lightened and thereby can follow more easily the unevenness of the ground and clear the obstacles which can arise. On the other hand, when the machine is lifted, for example for transport, rotor (3) is immobilized against stop (39) of frame (1).

On the machine according to FIG. 2, pressure spring (40) pushes on the part of rotor (3) which is behind hinge pin (6). This push also has a tendency to make rotor (3) pivot around its hinge pin (6) so that front wheels (29, 30) are partially lightened and rear wheel (28) is applied to the ground. In transport, rotor (3) also is immobilized against stop (39) of frame (1).

The machine according to FIGS. 3 and 4 can be moved in direction (A) and in direction (B). In work, it can be used in the rear as well as in the front of a tractor if the latter is equipped with a front hitching device. When the machine is moved in direction (A) (see FIGS. 3 and 5), lever (46) exerts a pressure on support pin (7) by eccentric (49). This pressure has a tendency to make rotor (3) pivot around its hinge pin (6) in the direction of arrow (E). In this case, a partial load transfer from front wheels (29, 30) onto rear wheel (28) is performed. The front wheels then more easily follow the unevenness of the ground and can easily clear possible obstacles. In addition, due to the fact that rear wheel (28) is applied to the ground, its positions is more stable. This makes it possible for it to better assure its function of orientation of control cam (10) of tool-holder arms (14).

Further, as soon as the machine is moved in direction (B) (FIGS. 4 and 6), wheel (28) is placed automatically behind support pin (7). During its positioning, it makes the support pin turn around its longitudinal geometric axis about 180°. With the latter, two wheels (29 and 30), control cam (10) and eccentric (49) also turn. The latter thus is disengaged from lever (46) and comes into contact with lever (47). The latter then exerts a pressure on support pin (7) through eccentric (49), which pressure tends to make entire rotor (3) pivot around hinge pin (6) in the direction of arrow (F). Thereby a partial load transfer from front wheels (29, 30) onto rear wheel (28) again is obtained so that the front wheels can better adapt to the ground and rear wheel (28) is stabilized.

In each of the two positions described above, projections (65 or 66) of lever (46 or 47) which is pushed on eccentric (49) is in slot (64) of the latter. This projection (65 or 66) contributes to keeping the unit which consists of eccentric (49), support pin (7), control cam (10) and wheels (28 to 30) in their position in particular when rear wheel (28) is no longer in contact with the ground and therefore can no longer assure the positioning of the unit. This occurs, for example, when the machine is lifted to turn around at the end of the field. Due to this feature, control cam (10) and the eccentric are not moved by the simple pressure of rollers (16) of tool-holder arms (14) on the cam and therefore are able to assume their role as soon as the machine is put back on the ground.

On the other hand, when the machine is completely disengaged from the ground, rotor (3) is pushed against stop (62 or 63) which is provided on frame (1). Rotor (3) thus is immobilized in this position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Agricultural machine movable in a direction of advance and having a frame adapted to be hooked to a drive tractor, said agricultural machine comprising:

at least one rotor having work tools attached thereto for moving products located on the ground and comprising a control cam for controlling said tools, said at least one rotor being connected to the frame by a hinge pin located at its upper part, said pin being substantially perpendicular to the direction of advance of the machine, said rotor further comprising a central support pin guided in rotation in said rotor so that it can turn at least 180° around its longitudinal axis, said control cam being fixed on said central support pin;

at least one front and at least one rear carrying wheels positioned on at least two lines offset with respect to one another in the direction of advance of the machine, wherein said carrying wheels are connected to the central support pin and move on the ground during work; and a pair of actuating means positioned between said frame and said central support pin for acting one or the other on said support pin as a function of the direction of advance of the machine to make said rotor pivot around said hinge pin, wherein, in a work position, a load supported by at least one of said front wheels, relative to the direction of advance, is decreased and at least one of the rear wheels, relative to the direction of advance, is pushed to the ground.

2. Machine according to claim 1, wherein said pair of actuating means are positioned above said hinge pin of said rotor on said frame.

3. Machine according to claim 2, wherein said pair of actuating means comprises first and second levers located one in front of and the other behind said support pin of said rotor, a spring pushing said first and second levers toward said support pin and an eccentric located on said support pin between said first and second levers.

4. Machine according to claim 3, wherein said first and second levers are connected to substantially vertical hinge pins which are integral with said frame.

5. Machine according to claim 4, wherein a rod is locked relative to one of said first and second levers and passes through the other of said first and second levers, said rod comprising, on its part located beyond the other of said first and second levers, a pressure spring compressed between said other of said first and second levers and a stop.

6. Machine according to claim 5, wherein said first and second levers comprise pivots for the passage of said rod.

7. Machine according to claim 6, wherein the frame comprises first and second stops to limit the pivoting of each of said first and second levers around its vertical hinge pin.

8. Machine according to claim 3, wherein said eccentric is positioned on the front side of said support pin relative to the direction of advance of the machine.

9. Machine according to claim 8, wherein said machine comprises means for immobilizing said support pin.

10. Machine according to claim 9, wherein said eccentric comprises a slot in its part located foremost relative to the direction of advance.

11. Machine according to claim 10, wherein each of said first and second levers comprises a projection adapted to be housed at least partially in said slot of said eccentric.

12. Machine according to claim 11, wherein said projections comprise rollers.

13. Machine according to claim 12, wherein said pair of actuating means are located in a compartment of the frame.

14. Machine according to claim 13, wherein the frame comprises stops for limiting the pivoting of said rotor.

* * * * *